United States Patent
Gorgels et al.

(10) Patent No.: US 12,196,603 B2
(45) Date of Patent: Jan. 14, 2025

(54) METHOD AND MEASURING SYSTEM

(71) Applicant: Klingelnberg GmbH, Hückeswagen (DE)

(72) Inventors: Christof Gorgels, Cologne (DE); Markus Finkeldey, Hattingen (DE)

(73) Assignee: KLINGELNBERG GMBH, Hückeswagen (DE)

(*) Notice: Subject to any disclaimer, the term of this patent is extended or adjusted under 35 U.S.C. 154(b) by 0 days.

(21) Appl. No.: 17/851,654

(22) Filed: Jun. 28, 2022

(65) Prior Publication Data
US 2023/0003574 A1 Jan. 5, 2023

(30) Foreign Application Priority Data

Jul. 2, 2021 (EP) ..................................... 21183561

(51) Int. Cl.
*G01H 9/00* (2006.01)
*F16F 15/02* (2006.01)

(52) U.S. Cl.
CPC ............... *G01H 9/00* (2013.01); *F16F 15/02* (2013.01)

(58) Field of Classification Search
CPC ...................................................... G01H 9/00
See application file for complete search history.

(56) References Cited

U.S. PATENT DOCUMENTS

| | | | |
|---|---|---|---|
| 9,752,860 B2* | 9/2017 | Marsh | G01B 5/202 |
| 10,209,051 B2 | 2/2019 | Ribbeck et al. | |
| 10,753,730 B2* | 8/2020 | Mies | G01B 11/306 |
| 2011/0032538 A1 | 2/2011 | Maschirow et al. | |
| 2019/0368863 A1* | 12/2019 | Mies | G01B 5/202 |
| 2020/0298362 A1* | 9/2020 | Finkeldey | B23Q 17/20 |

FOREIGN PATENT DOCUMENTS

| | | | | |
|---|---|---|---|---|
| DE | 102011052314 A1 * | 2/2013 | ............ | B23F 17/006 |
| EP | 3581883 A1 | 12/2019 | | |

OTHER PUBLICATIONS

English translation of DE102011052314 accessed from iq.ip.com Jun. 9, 2023.*

* cited by examiner

*Primary Examiner* — David Z Huang
*Assistant Examiner* — Jean F Morello
(74) *Attorney, Agent, or Firm* — CANTOR COLBURN LLP

(57) ABSTRACT

A method including the steps of providing a toothing having teeth with tooth flanks; measuring two or more teeth of the toothing, wherein the following steps are performed for each of the two or more teeth: measuring a segment of at least one tooth flank of the tooth, wherein the measuring is performed optically by an optical measuring device, extrapolating the measured segment to an extrapolated segment; and evaluating deviations of the extrapolated segments of the two or more teeth.

10 Claims, 4 Drawing Sheets

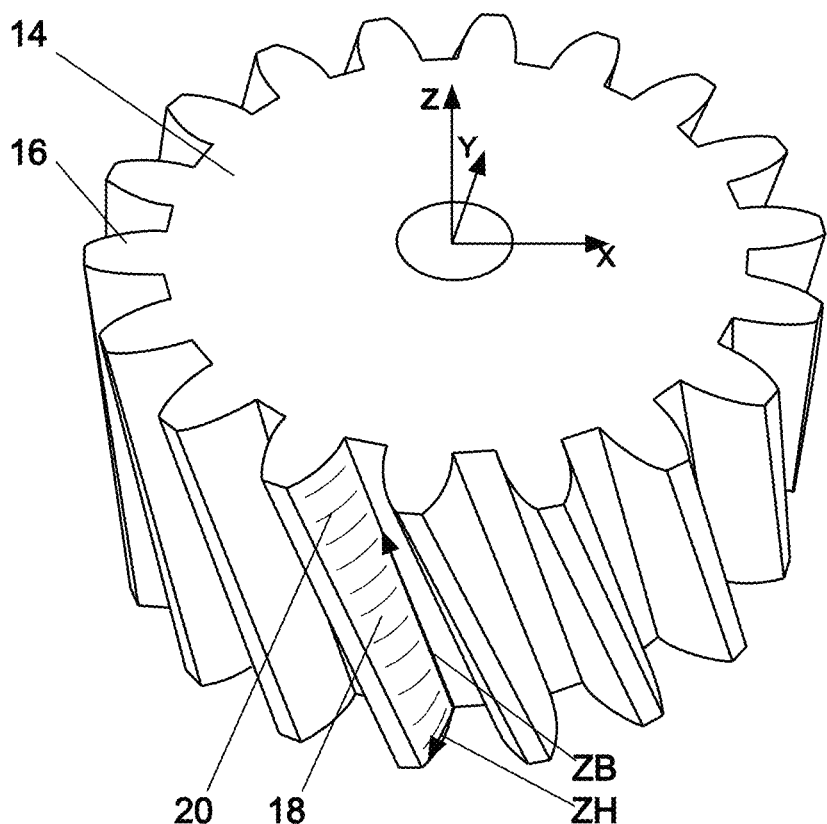
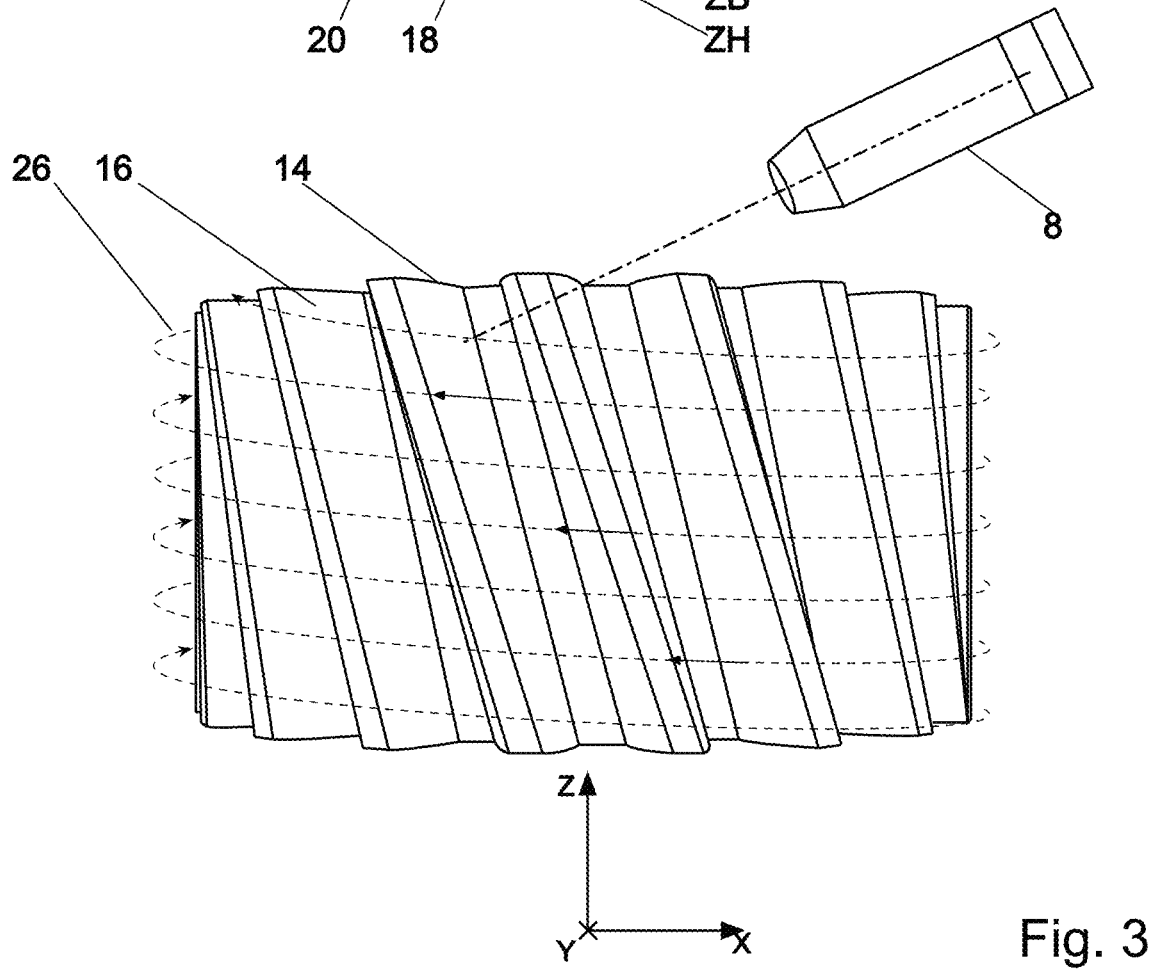
Fig. 2
Fig. 3

METHOD AND MEASURING SYSTEM

CROSS-REFERENCE TO RELATED APPLICATIONS

This application is related to and claims the benefit of European Patent Application No. 21183561.6, filed on Jul. 2, 2021, the contents of which are herein incorporated by reference in their entirety.

TECHNICAL FIELD

The present disclosure relates to a method for measuring and evaluating a toothing. The invention further relates to a measuring system for carrying out such a method.

BACKGROUND

The noise of vehicle transmissions is no longer masked by the engine noise in motor vehicles with hybrid drive or fully electric drive. Gear noise caused by the rolling of gear pairs in a transmission can therefore be perceived by vehicle occupants and be perceived as annoying. In the course of the trend towards hybrid drives or all-electric drives, the investigation of the noise behavior of gears has developed in recent years from a marginal discipline of university research to an important quality feature in the industrial production of transmissions.

It has been shown that simply reducing the deviations of a toothing from its nominal geometry, as determined in conventional individual defect testing, does not necessarily lead to better noise behavior of the toothing in noise testing or rolling element testing. Thus, when considering the individual defect testing, a toothing that is conspicuous for noise can be manufactured more precisely than a toothing that is not conspicuous for noise. For the manufacture of toothings, there is therefore a requirement on the one hand to comply with the specified manufacturing tolerances and on the other hand to additionally meet the noise behavior specifications.

The noise of a toothing is generated by the tooth contact, i.e. the rolling of the tooth flanks. To analyze the dominant frequencies of a noisy toothing, a noise measured during the rolling of a toothing is converted into an order spectrum, e.g. with the aid of the Fourier transform.

In addition to the tooth meshing orders, such an order spectrum also exhibits so-called "ghost orders", which cannot be influenced by the toothing design and result from manufacturing errors. Dominant ghost orders can be caused, for example, by clamping errors, tool errors, defective bearings or the axial feed within a machine tool. It can be seen, for example, that wobbling of a tool during the production of the toothing maps a periodically recurring deviation from the nominal geometry on the tooth flanks. This deviation can be measured geometrically with precise coordinate measuring machines.

In many cases, a correlation can be established between waviness that can be geometrically detected on the surfaces of the tooth flanks and the acoustically detected dominant ghost orders. Thus, with the help of the geometric detection of surface waviness of a toothing, a potentially critical noise behavior of a toothing and/or the condition of a machine tool can be concluded.

As input data for determining surface waviness and other toothing deviations, it is advantageous to acquire measurement data on the topography of the individual tooth flanks of a toothing as complete as possible. However, the complete measurement of the topography of each individual tooth flank is time-consuming and difficult to represent in industrial series production.

SUMMARY

The present disclosure is therefore based on the technical problem of specifying an improved method for measuring and evaluating deviations of a toothing, which in particular enables a reliable analysis of surface waviness with a short cycle time or measuring duration. Furthermore, a measuring system for carrying out such a method is to be specified.

The technical problem described above is solved in each case by the independent claims. Further embodiments of the disclosure result from the dependent claims and the description below.

According to a first aspect, the disclosure relates to a method comprising the steps of: providing a toothing having a plurality of teeth with tooth flanks; measuring two or more teeth of the toothing, wherein the following steps are performed for each of the two or more teeth: measuring a segment of at least one tooth flank of the tooth and wherein the measuring is performed optically by means of an optical measuring device, extrapolating the measured segment to an extrapolated segment; evaluating deviations of the extrapolated segments of the two or more teeth.

In particular, the method enables segments of the tooth flank, such as profile lines and/or the topography of the tooth flanks of the toothing, to be recorded quickly by performing the measurement optically and also by measuring only segments of the tooth flank that are extrapolated and then evaluated.

The method is based on the knowledge that in particular systematic deviations of the tooth flanks in the non-measured regions continue in a manner comparable to the measured areas and can therefore be extrapolated. It can therefore be assumed, for example, that a waviness which is measured in the area of a tooth center and which can be attributed, for example, to a bearing damage of a machine tool, will continue in the same way in the marginal areas of the tooth flank.

The extrapolation can be carried out, for example, with the aid of a known nominal geometry of the toothing, wherein, for example, measured waviness or deviations of the measured actual geometry of the toothing are transferred to non-measured regions of the actual geometry by superimposing the measured waviness or deviations of the actual geometry on the nominal geometry in the non-measured regions.

When reference is made in this case to extrapolated segments, these extrapolated segments include both the optically measured values or measuring points of the tooth flank and the values or points added by extrapolation, which are treated as measured values or measuring points in the evaluation.

It may be provided that the segment of the tooth flank comprises a section of a profile line of the tooth flank or consists of a section of a profile line of the tooth flank, and the extrapolation of the measured segment to the extrapolated segment comprises extrapolating the section of the profile line to an extrapolated profile line. The extrapolated segment may therefore be an extrapolated profile line.

It may further be provided that a length of the section of the profile line measured at the tooth flank is shorter than a tooth height of the tooth, wherein a length of the extrapolated profile line is greater than the length of the measured section of the profile line from which the extrapolated profile line has been extrapolated.

When reference is made in this case to extrapolated profile lines, these extrapolated profile lines include both the optically measured values or measuring points of the tooth flank and the values or points added by extrapolation, which are treated as measured values or measuring points in the evaluation.

It may be provided that the segment of the tooth flank comprises or consists of a section of a flank line of the tooth flank, and the extrapolation of the measured segment to the extrapolated segment comprises extrapolating the section of the flank line to an extrapolated flank line. The extrapolated segment may therefore be or comprise an extrapolated flank line.

When reference is made in this case to extrapolated flank lines, these extrapolated flank lines include both the optically measured values or measuring points of the tooth flank and the values or points added by extrapolation, which are treated as measured values or measuring points in the evaluation.

It may be provided that the segment of the tooth flank comprises a partial area of the tooth flank or consists of a partial area of the tooth flank and the extrapolation of the measured segment to the extrapolated segment comprises the extrapolation of the partial area to an extrapolated partial area. The extrapolated segment may therefore be or comprise an extrapolated partial area. The partial area may have been optically measured, for example, using a measurement grid or by measuring a plurality of sections of profile lines and/or sections of flank lines.

When reference is made in this case to extrapolated partial areas, these extrapolated partial areas include both the optically measured values or measuring points of the tooth flank and the values or points added by extrapolation, which are treated as measured values or measuring points in the evaluation.

The extrapolated partial area may also have interpolated values.

Sections of profile lines, sections of flank lines or partial areas of the tooth flank can be detected by means of the optical measuring system, for example, in such a way that a large number of individual measuring points are detected along the sections to be measured or distributed over the corresponding partial area. For this purpose, a resolution or a number of measuring points to be detected per unit of length or area to be detected can be specified.

In particular, a program can be used to evaluate the deviations, which requires as input data a larger area measured on the respective tooth flank than the optically measured segments of the tooth flanks would allow, in which the extrapolated segments are evaluated with this program. Insofar as the measured segments have, for example, sections of profile lines, an evaluation program can be used, for example, which usually requires tactilely recorded, complete profile lines or topography data as input data, but instead uses the optically recorded and extrapolated profile lines as input data.

When reference is made in this case to deviations, these concern deviations of the manufactured actual geometry of the toothing from a specified nominal geometry of the toothing.

When reference is made in this case to toothing, it refers in particular to a gear of a toothed gearing that is set up for transmitting and converting speeds and torques between rotating shafts. For example, such a gear may be a ring gear or a pinion of a bevel gear pair or a spur gear with straight or helical teeth of a cylindrical gear pair. Alternatively, the toothing may be a gear of a face gear pair used for positive transmission of a drive power between two shafts in the manner of a coupling.

When reference is made in this case to an optical measuring device, this optical measuring device comprises in particular an optical measuring system for optical distance measurement, such as a confocal chromatic distance sensor, a laser triangulation system or the like.

It may be provided that the evaluation of deviations comprises a determination of systematic deviations, wherein, in particular, a waviness analysis of the extrapolated segments, such as the extrapolated profile line, is performed. The waviness analysis may comprise a determination of a direction of surface waviness of the extrapolated segments, in particular extrapolated profile lines. Alternatively or additionally, the waviness analysis may comprise a frequency analysis of surface wavinesses of the extrapolated segments, in particular extrapolated profile lines.

It may be provided that at least one section of at least one or more further profile lines of the tooth flank are measured. It may therefore be provided that two or more sections of profile lines of a tooth flank are measured.

It may be provided that at least one section of a profile line is measured on all tooth flanks of the toothing. It may be provided that two or more sections of two or more profile lines can be measured on all tooth flanks of the toothing.

Alternatively or additionally, it may be provided that the length of a section of the profile line is more than 30% of the tooth height of the tooth, in particular more than 30% of a tooth height of the tooth reduced by a height of a tip relief and/or a height of the tooth root.

In particular, it may be provided that an optical measuring device is used whose measuring range covers more than 30% of the tooth height of the tooth, in particular more than 30% of a tooth height of the tooth reduced by a height of a tip relief and/or a height of the tooth root.

Alternatively or additionally, it may be provided that the length of the section of the profile line is less than 70% of the tooth height of the tooth, in particular less than 70% of a tooth height of the tooth reduced by a height of a tip relief and/or a height of the tooth root.

In particular, it may be provided that an optical measuring device is used whose measuring range covers less than 70% of the tooth height of the tooth, in particular less than 70% of a tooth height of the tooth reduced by a height of a tip relief and/or a height of the tooth root.

Alternatively or additionally, it may be provided that the section of the profile line lies within an active area of the tooth flank, and a length of the section of the profile line is less than a length of the active area of the tooth flank measured in the profile direction, wherein the active region of the tooth flank is the region that is in contact with a mating flank during operation of the gear when rolling.

Alternatively or additionally, it may be provided that an extrapolated topography of the tooth flank can be determined and this extrapolated topography is evaluated. An extrapolated topography can therefore be calculated from a plurality of sections, e.g. the profile lines of a flank, which is then subjected to a waviness analysis to determine surface waviness. In particular, a plurality of extrapolated profile lines is first determined for each flank.

When reference is made in this case to an extrapolated topography, this extrapolated topography includes both the optically measured values or measuring points of the tooth flank and the values or points added by the extrapolation, which are treated as measured values or measuring points in the evaluation.

The extrapolated topography may also have interpolated values.

According to a further embodiment of the method, it may be provided that two or more regions of the teeth are measured in a tactile manner, in particular four or more regions of the teeth are measured in a tactile manner, in particular exactly four regions or exactly eight regions of the teeth are measured in a tactile manner. The tactile measurement serves in particular to verify the extrapolated segments.

According to a further embodiment of the method, it may be provided that two or more profile lines of the teeth are measured in a tactile manner, in particular four or more profile lines of the teeth are measured in a tactile manner, in particular exactly four profile lines or exactly eight profile lines of the teeth are measured in a tactile manner. The tactile measurement serves in particular to verify the extrapolated profile lines.

In particular, the plausibility and/or the accuracy of the extrapolation can be checked. In particular, the extrapolation can be improved or adapted on the basis of the tactile measurement data.

It may be provided that the optical measuring device has a confocal chromatic distance sensor, wherein the confocal chromatic distance sensor in particular has a measuring range selected from a range of 2 mm to 4 mm, in particular has a measuring range of 2.5 mm.

To enable rapid measurement, it may be provided that the gear rotates in front of the optical measuring device during measurement, in particular at a constant angular velocity. For example, the gear to be measured is clamped in particular on a rotational axis or a turntable of the measuring device and can be rotated about its own axis by means of the turntable.

It may be provided that a substantially spiral measuring path is specified, wherein a coupled relative rotational and translational movement is performed between the optical measuring device and the gear. For example, it may be provided that the gear is rotated several times about its own axis during the measurement, and a translatory displacement of an optical sensor is superimposed on this rotation. In this way, measurement points for different positions of the tooth flanks along the tooth width are recorded several times at each tooth flank of the toothing.

According to a second aspect, the disclosure relates to a measuring system, having a measuring device for gear measurement, having a control and evaluation unit, wherein the control and evaluation unit is adapted to carry out the method according to the disclosure.

The measuring system may be a coordinate measuring machine for gear measurement.

The measuring system may be an integral part of a machine tool that is set up for machining the gear, for example by a tool with a geometrically defined cutting edge or with a geometrically undefined cutting edge, such as a milling tool or a grinding tool.

It may be provided that the measuring device has both an optical and a tactile measuring device for gear measurement. The terms tactile measuring device and tactile measuring system as well as optical measuring device and optical measuring system are used synonymously.

BRIEF DESCRIPTION OF THE DRAWINGS

The disclosure is described in more detail below with reference to a drawing illustrating exemplary embodiments.

The drawings schematically show in each case:

FIG. 2 shows a perspective view of a toothing to be measured;

FIG. 3 shows a side view of the toothing to be measured from FIG. 2;

DETAILED DESCRIPTION OF THE DRAWINGS

Figure 1:
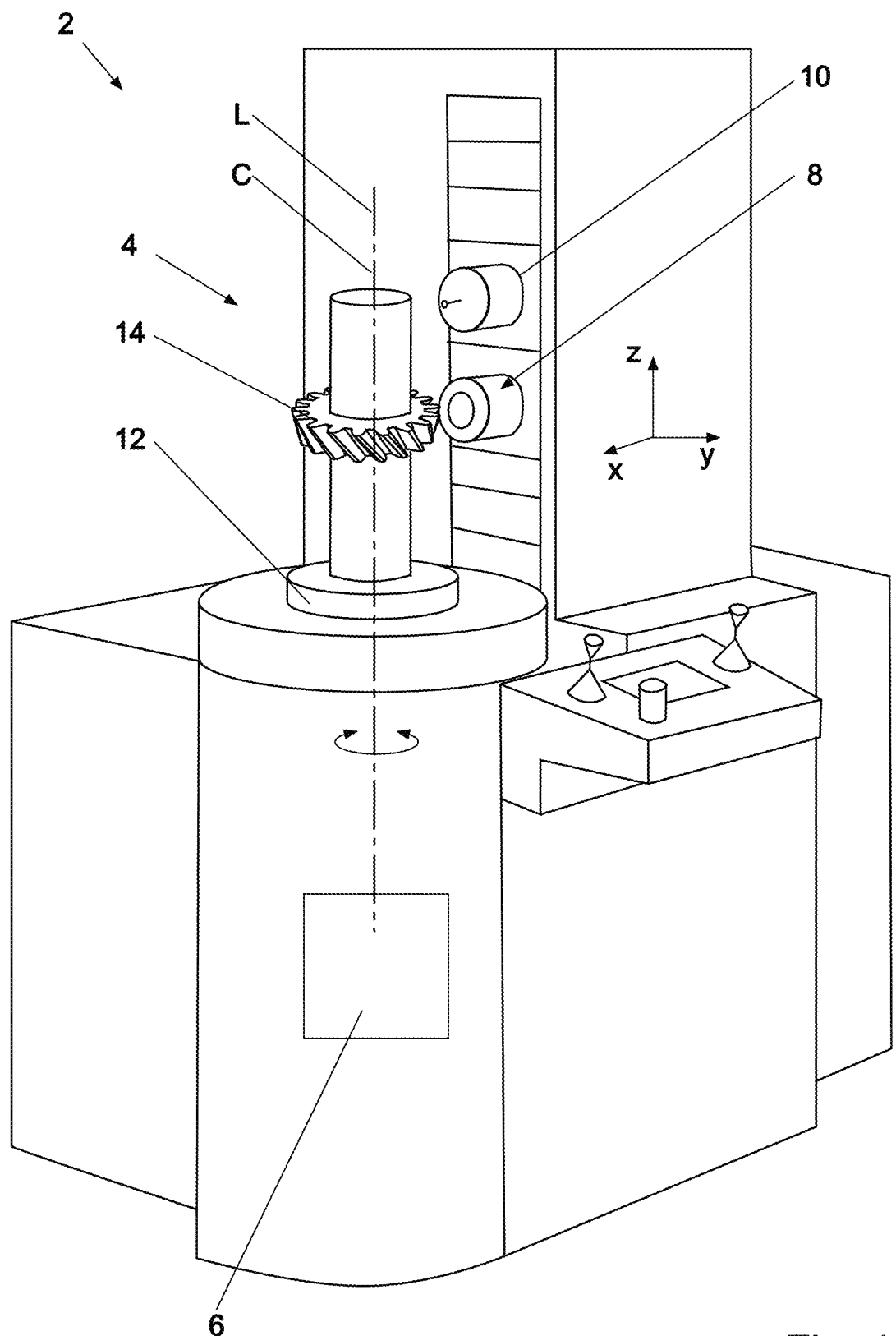
FIG. 1 shows a measuring system according to the disclosure.

FIG. 1 shows a measuring system 2 according to the disclosure, having a measuring device 4 for gear measurement, having a control and evaluation unit 6, wherein the control and evaluation unit 6 is adapted to carry out the method according to the disclosure described below. The measuring device 4 for gear measurement has an optical measuring device 8 or an optical measuring system 8 and a tactile measuring device 10 or a tactile measuring system 10, which are each adapted for gear measurement.

The measuring system 2 has a turntable 12, with which a toothing 14 to be measured can be rotated about its longitudinal axis L. The turntable 12 thus realizes a rotational axis C of the measuring system 2. The turntable 12 thus realizes a rotational axis C of the measuring system 2, wherein the rotational axis C and the longitudinal axis L coincide or are collinear.

The optical measuring device 8 and the tactile measuring device 10 are displaceable in a translatory manner along the Cartesian coordinate axes x, y, z. Accordingly, the measuring system 2 has three translational degrees of freedom and one rotational degree of freedom to realize a relative movement during a measurement between the toothing 14 to be measured and the measuring devices 8, 10.

In the present case, the optical measuring system 8 is a confocal chromatic distance sensor 8.

In a first method step (A), the toothing 14 is first provided, which has a plurality of teeth 16 with tooth flanks 18 (FIG. 2).

In a second method step (B), a measurement of two or more teeth 16 of the toothing 14 is performed, wherein the following method steps are performed for each of the two or more teeth 16:

Measuring a segment 20 of the tooth flank 18 of the tooth 16 and extrapolating the measured segment 20 to an extrapolated segment 24. In the present example, the measured segment 20 is a section 20 of a profile line 22 and the extrapolated segment 24 is an extrapolated profile line 24.

Figure 4:
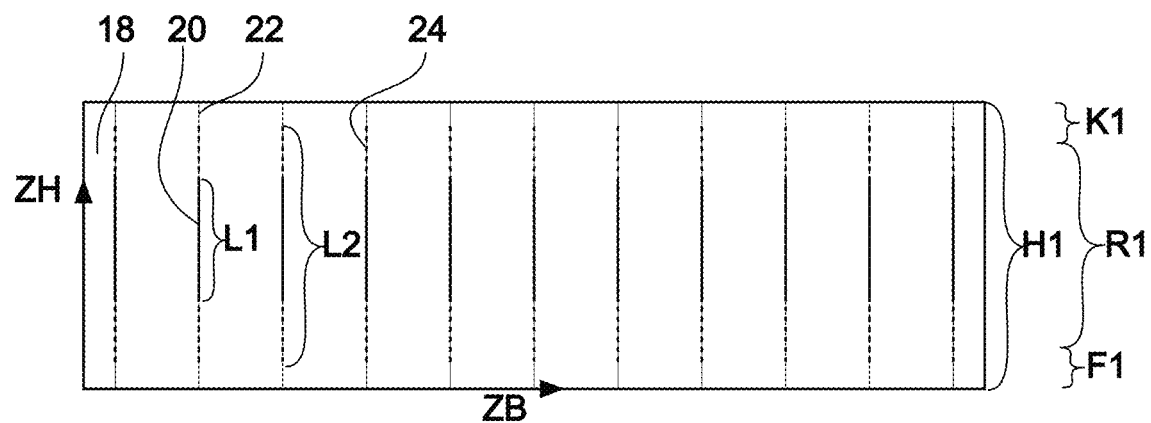
FIG. 4 shows a representation of a tooth flank to be measured.

FIG. 4 shows an example of the measured tooth flank 18 in a simplified schematic representation. A coordinate ZH is used for the tooth height direction and a coordinate ZB is used for the tooth width direction (FIG. 2 and FIG. 4).

The reference sign 20 denoted in each case a segment 20 of a profile line 22, wherein the segment 20 has the length L1 and is represented by a solid thick line. A length of the profile line 22 corresponds to the tooth height H1 of the tooth 16, wherein a respective profile line 22 is represented by a thin solid line. The length L1 of the segments 20 measured at the tooth flank 18 is therefore shorter than the tooth height H1 of the tooth 16 or the tooth flank 18.

The measurement of the segments 20 of the profile lines 22 is first performed by means of the optical measuring device 8. Each of the measured segments 20 is extrapolated to the extrapolated profile lines 24, wherein a length L2 of the respective extrapolated profile line 24 is greater than the length L1 of the measured segment 20 of the respective profile line 22. The extrapolated profile line 24 therefore includes both the measured segment 20 and additionally of the values or extrapolated sections added by the extrapolation which exceed the length L1 of the measured segment 20.

In a third method step (C), deviations of the extrapolated profile lines 24 of the two or more teeth 16 are evaluated.

As shown in the illustration of FIG. 4, a plurality of segments 20 are acquired for each tooth flank 18, wherein each of the segments 20 is associated with a profile line 22 and each extrapolated to an extrapolated profile line 24.

The evaluation of deviations presently has a determination of systematic deviations, wherein a waviness analysis of the extrapolated profile lines 24 is performed, and the waviness analysis has both a determination of a direction of surface wavinesses of the extrapolated profile lines 24 and a frequency analysis of the surface wavinesses of the extrapolated profile lines 24.

In the present case, the length L1 of the segment 20 of the profile line 22 covers more than 30% of the tooth height H1 of the tooth 16. Consequently, the length L1 of the segment 20 of the profile line 22 also covers more than 30% of a tooth height R1 of the tooth 18 reduced by a height K1 of a tip relief and a height F1 of the tooth root of the tooth 16.

Furthermore, the length L1 is less than 70% of the tooth height H1 of tooth 16.

Figure 5:
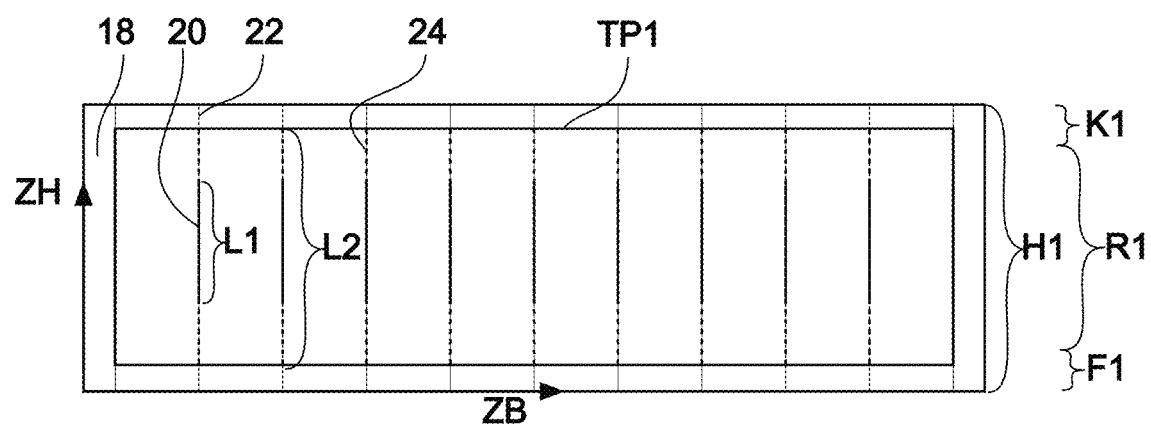
FIG. 5 shows a representation of a tooth flank to be measured.

An extrapolated topography TP1 can also be determined from the measured segments 20 and evaluated (FIG. 5). The extrapolated topography TP1 comprises both the optically measured values or measuring points of the tooth flank and the values or points added by the extrapolation, which are treated as measured values or measuring points in the evaluation. The extrapolated topography TP1 also has interpolated values.

Figure 6:
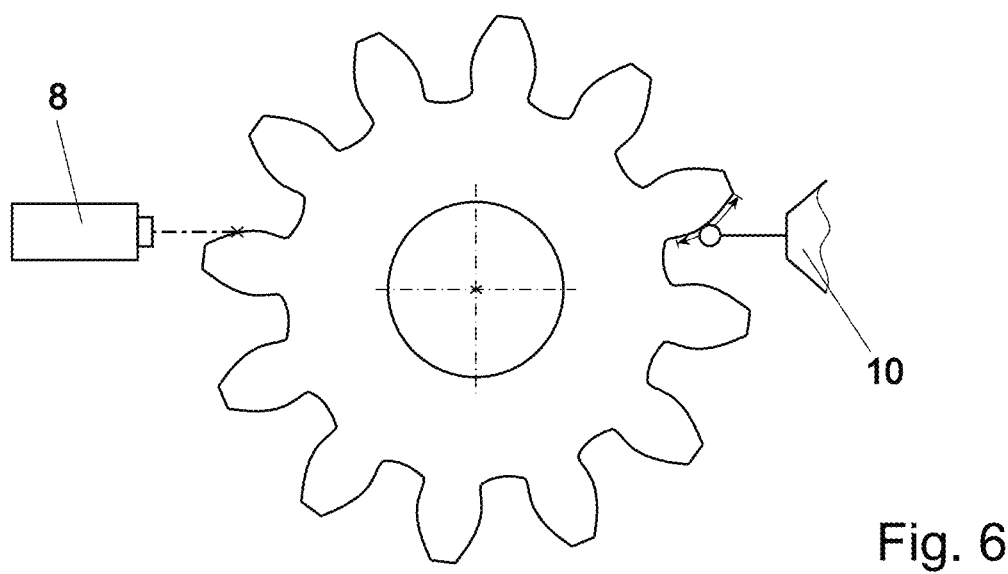
FIG. 6 shows a complementary tactile measurement.

As schematically indicated in FIG. 6, two or more profile lines 22 of the teeth 16 are measured in a tactile manner and the results of the tactile measurement are used to verify the extrapolated profile lines 24.

FIG. 3 shows the optical measurement of the segments of the profile lines, wherein several segments of profile lines are measured on all teeth 16. During the optical measurement, the gear 14 rotates about its own axis L, which is shown coinciding with the Z-axis to simplify the representation.

During rotation of the gear 14, the optical sensor 8 is moved translationally in the z-direction, resulting in the measuring spiral 26 shown, and thus each tooth flank 16 is detected several times by the optical sensor 8. Thus, a plurality of segments 20 of profile lines 22 can be detected in a simple and speedy manner.

In method step C), the measured values are evaluated, wherein the individual measuring points of the extrapolated profile lines are assigned a rotation angle corresponding to the rolling of the gear 14. Subsequently, a geometrically recorded order spectrum is determined by an order analysis of the deviations plotted over the angle of rotation, wherein one or more compensation and/or interpolation functions can be determined.

Figure 7:
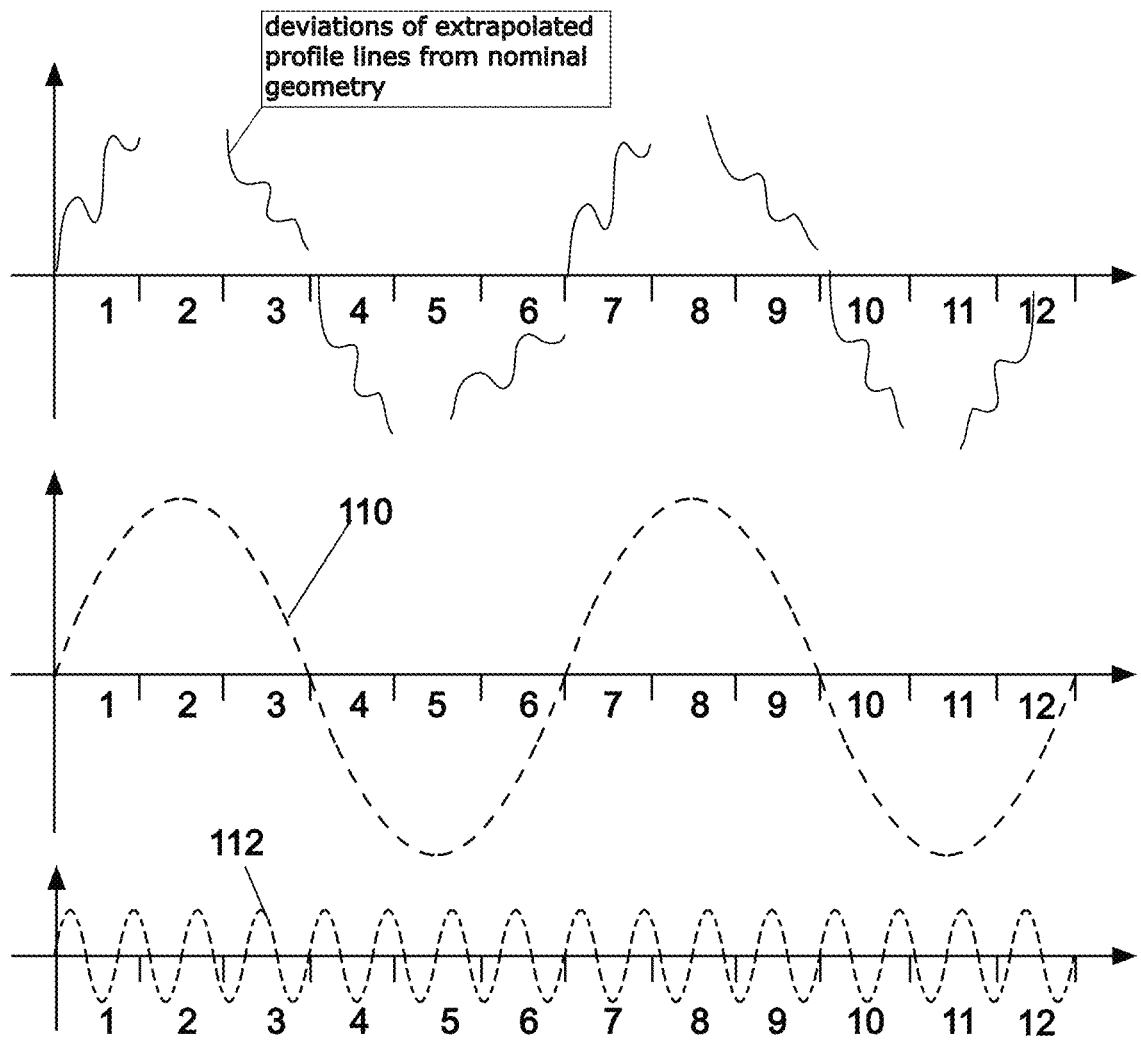
FIG. 7 shows an illustration of deviations above the angle of rotation.
Figure 8:
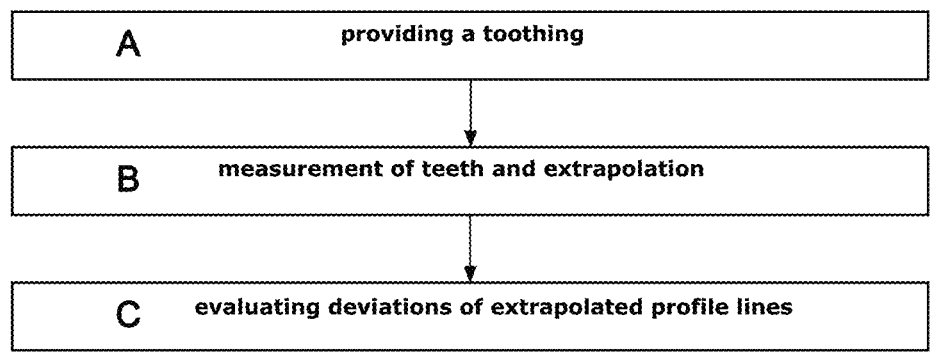
FIG. 8 shows a flow chart of the method according to the disclosure.

FIG. 7 shows exemplary deviations of extrapolated profile lines for some of 12 tooth flanks from a specified nominal geometry in line with the angle of rotation during rolling. The deviations (ordinate) are thus plotted over the angle of rotation (abscissa) in such a way that they would contribute to the noise excitation in succession during gear meshing.

In the present case, the compensation angle function 110 with the largest amplitude is first determined for the deviations plotted over the angle of rotation. This compensation angle function 110 represents a first dominant frequency of the geometric deviations plotted over the angle of rotation. In the present case, the compensation angle function 110 is a sinusoidal function.

In a next step, the deviations are adjusted by the compensation angle function 110. Subsequently, the compensation angle function 112 with the largest amplitude is determined, which represents the second dominant frequency of the geometrically recorded deviations.

In this way, an order spectrum can be successively determined from the geometrically recorded deviations in order to analyze the surface waviness. Since only segments of the profile lines were measured optically in method step B), a rapid analysis of the surface waviness of the tooth flanks 102 of the toothing 100 can follow.

The invention claimed is:

1. A method, having the following steps:
   providing a toothing having a plurality of teeth with tooth flanks;
   measuring two or more teeth of the toothing, wherein the following steps are performed for each of the two or more teeth:
   measuring a segment of at least one tooth flank of the tooth, wherein the measuring is performed optically by means of an optical measuring device, and
   extrapolating the measured segment to an extrapolated segment; and
   evaluating deviations of the extrapolated segments of the two or more teeth.

2. The method according to claim 1, wherein
   the segment comprises a section of a profile line of the tooth flank or includes a section of a profile line of the tooth flank, and
   the extrapolation of the measured segment to the extrapolated segment comprises extrapolating the section of the profile line to an extrapolated profile line.

3. The method according to claim 2, wherein
   a length of the section of the profile line measured at the tooth flank is shorter than a tooth height of the tooth, wherein a length of the extrapolated profile line is greater than the length of the measured section of the profile line from which the extrapolated profile line has been extrapolated.

4. The method according to claim 1, wherein
   the evaluation of deviations comprises a determination of systematic deviations,
   wherein a waviness analysis of the extrapolated segments is performed,
   the waviness analysis comprises determining a direction of surface waviness of the extrapolated segments and/or
   the waviness analysis comprises a frequency analysis of surface waviness of the extrapolated segments.

5. The method according to claim 2, wherein
   at least one section of at least one or more further profile lines of the tooth flank are measured, and/or the length of the section of the profile line is more than 30% of the tooth height of the tooth, reduced by a height of a tip relief and/or a height of the tooth root of the tooth, and/or the length of the section of the profile line is less than 70% of the tooth height of the tooth reduced by a height of a tip relief and/or a height of the tooth root of the tooth, and/or an extrapolated topography of the tooth flank is determined and this extrapolated topography is evaluated, and/or the section of the profile line lies within an active area of the tooth flank, and a length of the section of the profile line is less than a length of the active area of the tooth flank measured in the profile direction, wherein the active region of the tooth flank is the region that is in contact with a mating flank during operation of the gear when rolling.

6. The method according to claim 1, wherein two or more regions of the teeth are measured in a tactile manner, wherein the areas measured in a tactile manner are used to verify the extrapolated segments.

7. The method according to claim 1, wherein the optical measuring device comprises a confocal chromatic distance sensor, wherein the confocal chromatic distance sensor has a measuring range selected from a range of 2 mm to 4 mm.

8. The method according to claim 1, wherein the toothing rotates in front of the optical measuring device during the measurement at a constant angular velocity.

9. The method according to claim 1, wherein a substantially spiral measuring path is predetermined, wherein a coupled relative rotational and translational movement is performed between the optical measuring device and the toothing.

10. A measuring system, having a measuring device for gear measurement, having a control and evaluation unit, wherein the control and evaluation unit is adapted to carry out a method according to claim 1, and the measuring device for gear measurement has both an optical measuring device and a tactile measuring device for gear measurement.

* * * * *